(12) United States Patent
Sonokawa

(10) Patent No.: US 10,378,665 B2
(45) Date of Patent: Aug. 13, 2019

(54) PRESSURE CONTROL VALVE

(71) Applicant: Shimadzu Corporation, Kyoto (JP)

(72) Inventor: Shogo Sonokawa, Shiga (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 15/747,906

(22) PCT Filed: Sep. 18, 2015

(86) PCT No.: PCT/JP2015/076758
§ 371 (c)(1),
(2) Date: Jan. 26, 2018

(87) PCT Pub. No.: WO2017/046955
PCT Pub. Date: Mar. 23, 2017

(65) Prior Publication Data
US 2018/0224010 A1   Aug. 9, 2018

(51) Int. Cl.
*F16K 17/06* (2006.01)
*F16K 17/04* (2006.01)
*F16K 47/02* (2006.01)
*F16K 31/383* (2006.01)

(52) U.S. Cl.
CPC ...... *F16K 17/0433* (2013.01); *F16K 31/3835* (2013.01); *F16K 47/02* (2013.01)

(58) Field of Classification Search
CPC ...... F16K 17/0433; F16K 17/04; F16K 47/02; F16K 47/08
USPC ...... 137/490, 514, 491, 486, 489, 489.5, 82, 137/84, 85; 251/282
See application file for complete search history.

(56) References Cited

U.S. PATENT DOCUMENTS

| 382,643 | A | * | 5/1888 | Fox | F16K 15/025 |
|---|---|---|---|---|---|
| | | | | | 137/506 |
| 4,013,093 | A | * | 3/1977 | Pensa | F16H 39/02 |
| | | | | | 137/491 |
| 5,063,961 | A | * | 11/1991 | Brunner | F16J 15/104 |
| | | | | | 137/454.5 |

(Continued)

FOREIGN PATENT DOCUMENTS

| JP | S58-67177 U | 5/1983 |
|---|---|---|
| JP | 2000-230669 A | 8/2000 |
| JP | 2009-162349 A | 7/2009 |

OTHER PUBLICATIONS

International Search Report dated Dec. 22, 2015 of corresponding International application No. PCT/JP2015/076758; 4 pgs.

(Continued)

*Primary Examiner* — Minh Q Le
(74) *Attorney, Agent, or Firm* — Maier & Maier, PLLC

(57) ABSTRACT

A pressure control valve provided with: a main valve section provided with a main valve body having a backpressure chamber on the inside thereof, and a valve housing body that is provided with a main valve seat in which said main valve body can be seated and has a pilot chamber for slidably housing the main valve body; and a pilot valve section that is provided with a pilot valve body and a pilot valve seat member having a pilot valve seat in which said pilot valve body can be seated, and in which the pilot valve body separates from the pilot valve seat to open when the pressure inside the pilot chamber has exceeded a prescribed pressure.

1 Claim, 5 Drawing Sheets

(56) References Cited

U.S. PATENT DOCUMENTS

| | | | | |
|---|---|---|---|---|
| 5,603,348 A * | 2/1997 | Geringer | ............ | F16K 17/0433 137/454.5 |
| 6,745,792 B2 * | 6/2004 | Koo | ...................... | F16K 17/105 137/491 |
| 6,986,362 B2 * | 1/2006 | Cheong | ................. | F15B 13/024 137/491 |
| 7,077,157 B2 * | 7/2006 | Cavagna | ................ | F16K 17/10 137/329.3 |
| 7,159,610 B2 * | 1/2007 | Cheong | ................. | F16K 17/105 137/491 |
| 7,665,579 B2 * | 2/2010 | Itose | ........................ | B66F 9/22 137/490 |
| 8,375,981 B2 * | 2/2013 | Jeon | ..................... | F16K 17/105 137/488 |
| 9,851,015 B2 * | 12/2017 | Neubauer | ............ | F16K 17/105 |
| 2004/0089347 A1 | 5/2004 | Cavagna | | |
| 2007/0056632 A1 * | 3/2007 | Cheong | ................. | F16K 17/105 137/491 |
| 2011/0114203 A1 | 5/2011 | Mazzoni | | |
| 2013/0032225 A1 * | 2/2013 | Kim | ...................... | F15B 13/024 137/489.5 |
| 2015/0362081 A1 * | 12/2015 | Kakio | .................. | F15B 13/024 137/505 |
| 2016/0131277 A1 * | 5/2016 | Kuromusha | .......... | F16K 17/105 137/489 |

OTHER PUBLICATIONS

Chinese Office Action dated Dec. 20, 2018, in connection with corresponding CN Application No. 201580082964.8 (13 pgs., including machine-generated English translation).

Office Action dated May 24, 2019, in corresponding Chinese Application No. 201580082964.8; 10 pages.

* cited by examiner

PRESSURE CONTROL VALVE

FIELD

The present invention relates to a pressure control valve which is used in a hydraulic circuit used in an industrial vehicle or the like and is opened when an input-side liquid pressure exceeds a predetermined liquid pressure.

BACKGROUND

Hitherto, as a pressure control valve used in a hydraulic circuit used for an industrial vehicle or the like, there is known a balance piston type relief valve illustrated in FIG. 5 as below. Such a pressure control valve a3 is provided between an input port a1c receiving a hydraulic liquid and a tank port aid communicating with a tank storing the hydraulic liquid and includes a main valve portion a4 which is formed by using a main valve body a6 and a valve accommodation body a7 including a main valve seat a7a on which the main valve body a6 sits and a pilot chamber a1b which accommodates the main valve body a6 in a slidable manner and a pilot valve portion a5 which is formed by using a pilot valve body a8 and a pilot valve seat member a9 which has a pilot valve seat a9a on which the pilot valve body a8 sits and is fixed to the valve accommodation body a7 of the main valve portion a4. The main valve body a6 and the pilot valve body a8 are all urged by urging members a101 and a102 to respectively sit on the main valve seat a7a and the pilot valve seat a9a. Then, when the main valve portion a4 and the pilot valve portion a5 are all switched to a valve closed state, a hydraulic pressure inside the input port a1c acts on the pilot valve body a8 through the back pressure chamber a6a of the main valve body a6.

Here, when a pressure inside the input port a1c becomes a predetermined value or more, a hydraulic pressure acting on the pilot valve body a8 overcomes an urging force generated by the urging member a102, the pilot valve body a8 is separated from the pilot valve seat a9a, and the pilot valve portion a5 is switched to a valve opened state. At this time, since the inside of the back pressure chamber a6a communicates with the tank port aid, a flow of the hydraulic liquid from the input port a1c toward the tank port aid occurs and thus the hydraulic liquid flows through the hole a6b of the main valve body a6. In response to the flow rate through the hole a6b, a differential pressure is generated between the inside of the input port a1c and the inside of the back pressure chamber a6a. Accordingly, since a force caused by the differential pressure overcomes an urging force generated by the urging member a101, the main valve body a6 is also separated from the main valve seat a7a and the main valve portion a4 is also switched to a valve opened state.

However, when the main valve portion a4 is switched to the valve opened state, the hydraulic liquid flows through a gap formed between the main valve body a6 and the main valve seat a7a. Since the flow of the hydraulic liquid is fast and unstable, a slight change in hydraulic liquid pressure occurs. For that reason, there is a case where chattering occurs due to a change in direction of a force applied to the main valve body. At that time, a problem arises in that a vibration or noise occurs inside the hydraulic circuit.

As one configuration for suppressing such a problem, a configuration in which a member for guiding an operation direction of the main valve body is provided outside the main valve body is considered (for example, see Patent Document 1). With such a configuration, since the operation direction of the main valve body at the time of opening the valve is guided, it is possible to prevent a collision between the main valve body and the valve accommodation body to a certain degree.

However, at the moment in which the main valve body is switched to the valve opened state, the magnitude of the force applied to the hydraulic liquid pressure suddenly changes and the direction of the force applied to the main valve body suddenly changes. At that time, since the main valve body suddenly moves, the main valve body suddenly collides with the valve accommodation body so that a problem such as a vibration or noise occurs inside the hydraulic circuit.

Patent Document

Patent Document 1: JP-A-2009-162349

SUMMARY

The invention focuses on the above-described points and an object of the invention is to suppress a problem such as a vibration or noise inside a hydraulic circuit by stabilizing an operation of a main valve body.

In order to solve the above-described problems, the pressure control valve according to the invention has the following configuration. That is, there is provided a pressure control valve including: a main valve portion which includes a main valve body having a back pressure chamber formed therein and a valve accommodation body having a main valve seat on which the main valve body sits and a pilot chamber accommodating the main valve body in a slidable manner; and a pilot valve portion which includes a pilot valve body and a pilot valve seat member having a pilot valve seat on which the pilot valve body sits, in which when a pressure inside the pilot chamber exceeds a predetermined pressure, the pilot valve body is separated from the pilot valve seat to open the valve, and in which a damper is provided between the main valve body and the pilot valve seat member.

With such a configuration, since the damper is provided between the main valve body and the pilot valve seat member, a resistance is generated by a damping action when the main valve body performs a valve opening operation and thus a sudden change in direction of the main valve body is suppressed. Thus, it is possible to suppress the chattering of the main valve body without changing a design of the main valve body. For this reason, it is possible to suppress a problem such as a vibration or noise inside the hydraulic circuit by stabilizing the operation of the main valve body.

Particularly, when a front end portion of the pilot valve seat member is provided with a guide portion which reaches the inside of the back pressure chamber inside the main valve body and guides the reciprocating movement direction of the main valve body, the volume of the back pressure chamber changes. Accordingly, it is possible to suppress an unstable change in pressure and flow rate due to compressibility slightly existing in the hydraulic liquid inside the back pressure chamber. That is, it is possible to stabilize a hydraulic pressure applied to a pilot poppet and to suppress the chattering of the pilot poppet. Further, since the reciprocating movement direction of the main valve body is guided by the guide portion, it is possible to suppress a problem in which the direction of the main valve body is suddenly changed and the main valve body and the valve accommodation body collide with each other to generate noise.

In the pressure control valve including the guide portion, as a configuration of forming the damper with a simple configuration, a space between the pilot valve seat member and the front end of the main valve body and outside the guide portion can be used.

According to the invention, it is possible to suppress a problem such as a vibration or noise inside a hydraulic circuit by stabilizing an operation of a main valve body.

DETAILED DESCRIPTION OF DRAWINGS

A first embodiment of the invention will be described below with reference to FIGS. 1 to 4.

Figure 1:
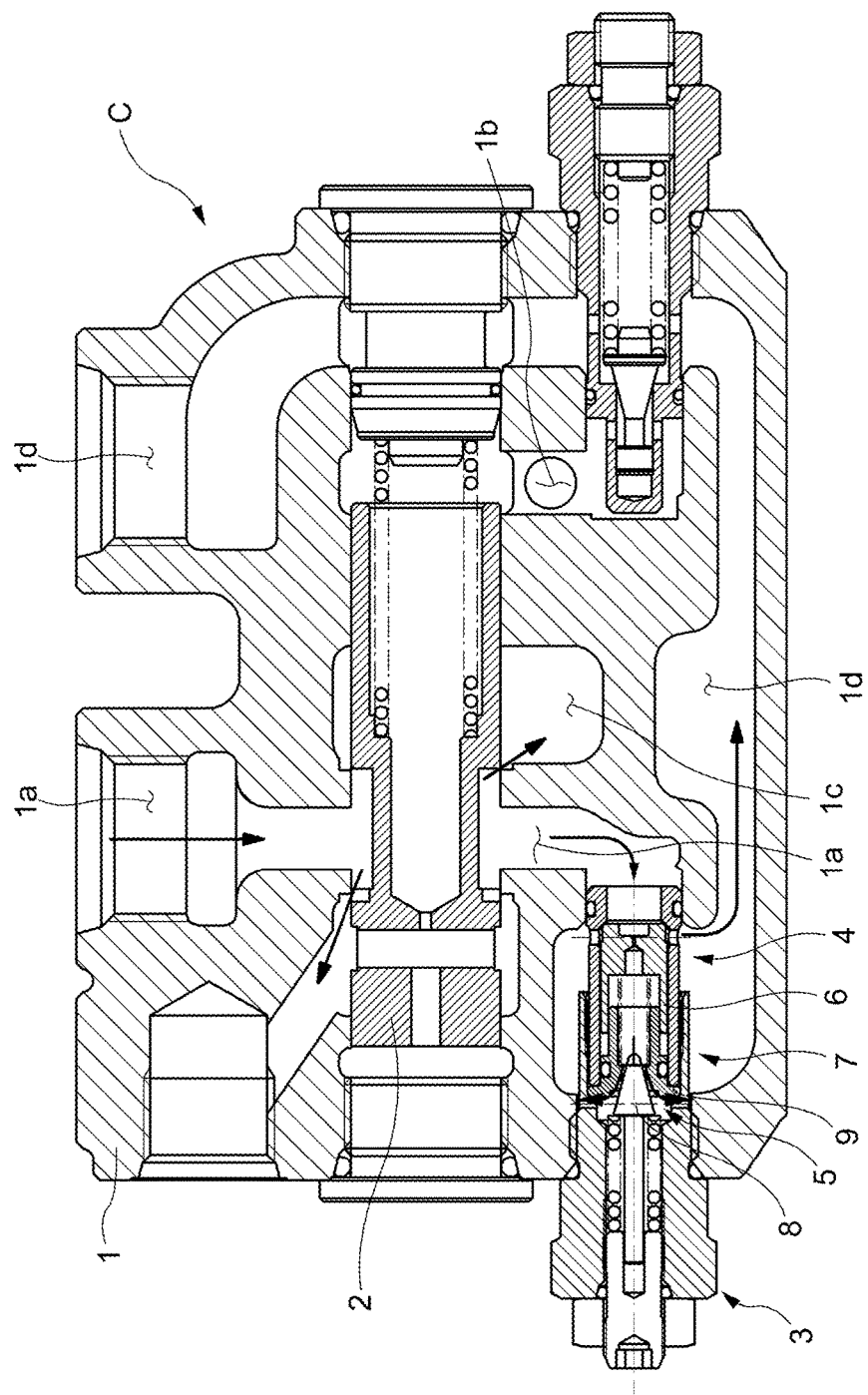
FIG. 1 is a schematic diagram illustrating a control valve according to a first embodiment of the invention.

A control valve C according to the embodiment is used in a hydraulic system used for an industrial vehicle or the like and includes, as illustrated in FIG. 1, at least a casing 1, a flow dividing valve 2 which is attached to the casing 1, and a pressure control valve 3 of the invention attached to the casing 1. The casing 1 is provided with a pressure oil input port 1a which is an input port for receiving a hydraulic liquid, a steering passage 1b which discharges a hydraulic liquid to a hydraulic system (not illustrated) for controlling the steering, a cargo handling passage 1c which discharges a hydraulic liquid to a hydraulic system (not illustrated) for controlling a cargo handling device, and a low-pressure passage 1d which is a tank port communicating with a tank (not illustrated) for storing a hydraulic liquid. The flow dividing valve 2 is disposed inside a flow dividing valve accommodation hole 1e communicating with the pressure oil input port 1a, the steering passage 1b, and the cargo handling passage 1c and is used to guide a part of the hydraulic liquid input from the pressure oil input port 1a through a communication passage formed therein to the steering passage 1b and to guide a rest of the hydraulic liquid input from the pressure oil input port 1a to the cargo handling passage 1c while changing an opening degree in response to a change in pressure inside the pressure oil input port 1a. The pressure control valve 3 is provided between the pressure oil input port 1a and the low-pressure passage 1d and includes a main valve portion 4 and a pilot valve portion 5.

Here, the hydraulic liquid which is input from the pressure oil input port 1a to the control valve C is divided into the steering passage 1b and the cargo handling passage 1c through the flow dividing valve 2 as described above. However, when a pressure of the pressure oil input port 1a exceeds a predetermined pressure due to an increase in hydraulic pressure of the hydraulic liquid divided to the cargo handling passage 1c, the pilot valve portion 5 of the pressure control valve 3 is first opened and then the main valve portion 4 is opened. At this time, the hydraulic liquid flows from the pressure oil input port 1a to the low-pressure passage 1d. That is, the pressure control valve 3 has a function of adjusting a pressure inside the pressure oil input port 1a so that the pressure does not exceed a predetermined pressure. Hereinafter, a detailed configuration of the pressure control valve 3 will be described.

Figure 2:
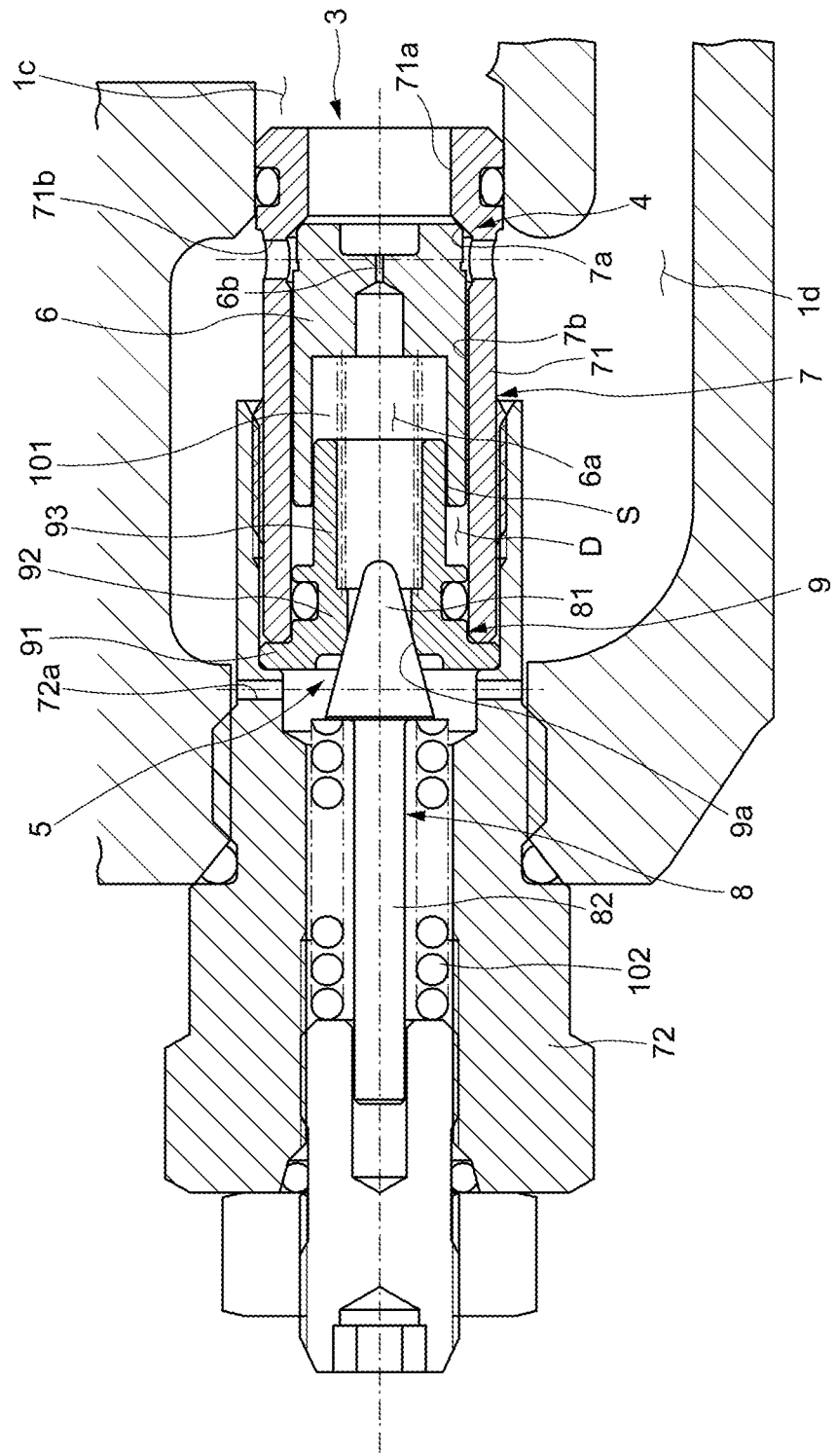
FIG. 2 is a schematic diagram illustrating a pressure control valve according to the same embodiment.

The pressure control valve 3 includes, as illustrated in FIG. 2, a main valve portion 4 which is formed by using a main valve body 6 and a valve accommodation body 7 including a main valve seat 7a on which the main valve body 6 sits and a pilot chamber 7b accommodating the main valve body 6 in a slidable manner and a pilot valve portion 5 which is formed by using a pilot valve body 8 and a pilot valve seat member 9 including a pilot valve seat 9a on which the pilot valve body 8 sits and fixed by a first sleeve 71 and a second sleeve 72. Further, as described above, the pressure control valve 3 is a balance piston type relief valve which is disposed between the pressure oil input port 1a and the low-pressure passage 1d and is used to communicate the pressure oil input port 1a and the low-pressure passage 1d with each other when the pilot valve portion 5 and the main valve portion 4 are opened and interrupt the communication between the pressure oil input port 1a and the low-pressure passage 1d in other cases.

Figure 3:
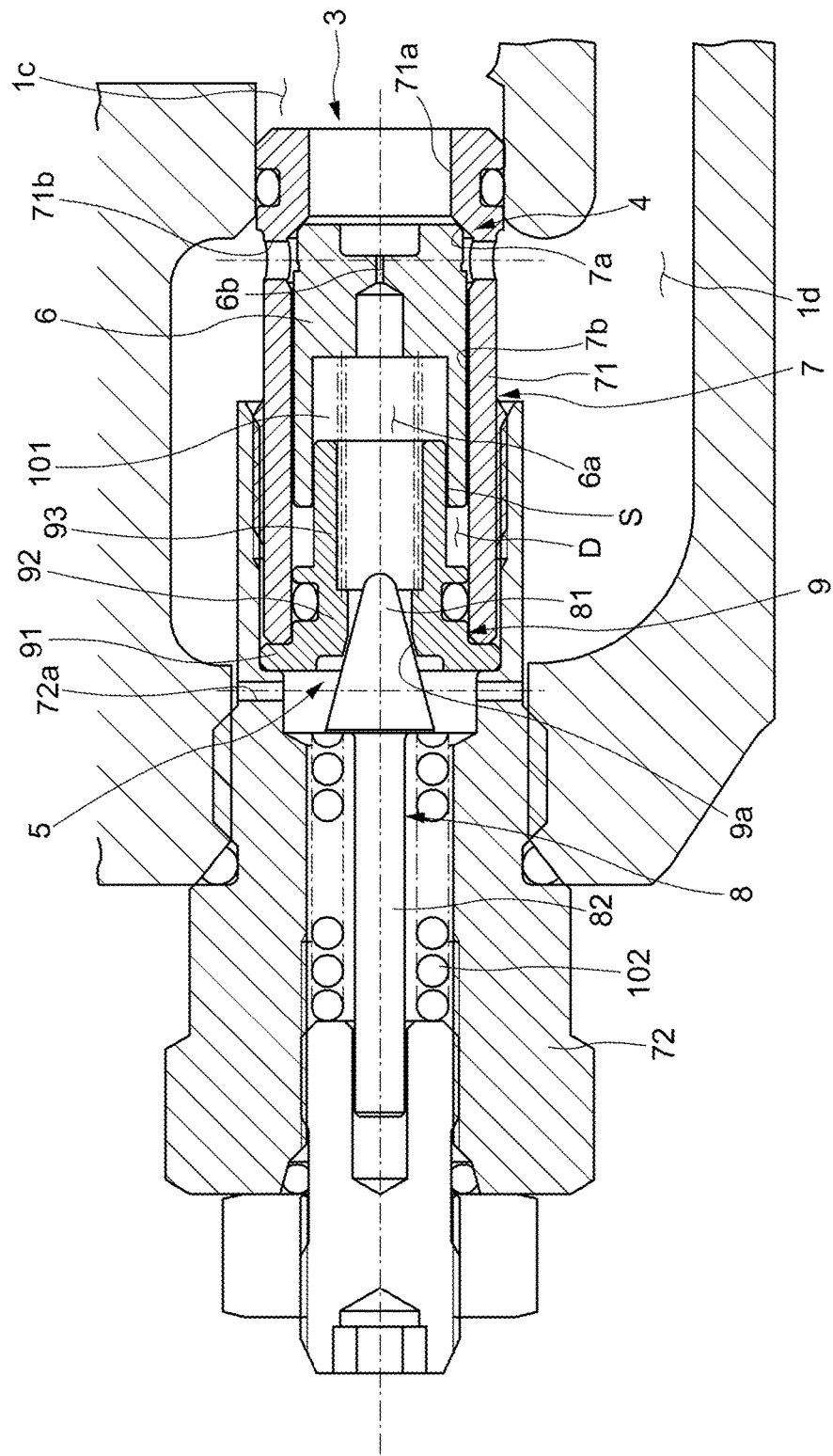
FIG. 3 is an explanatory diagram illustrating an operation of the pressure control valve according to the same embodiment.
Figure 4:
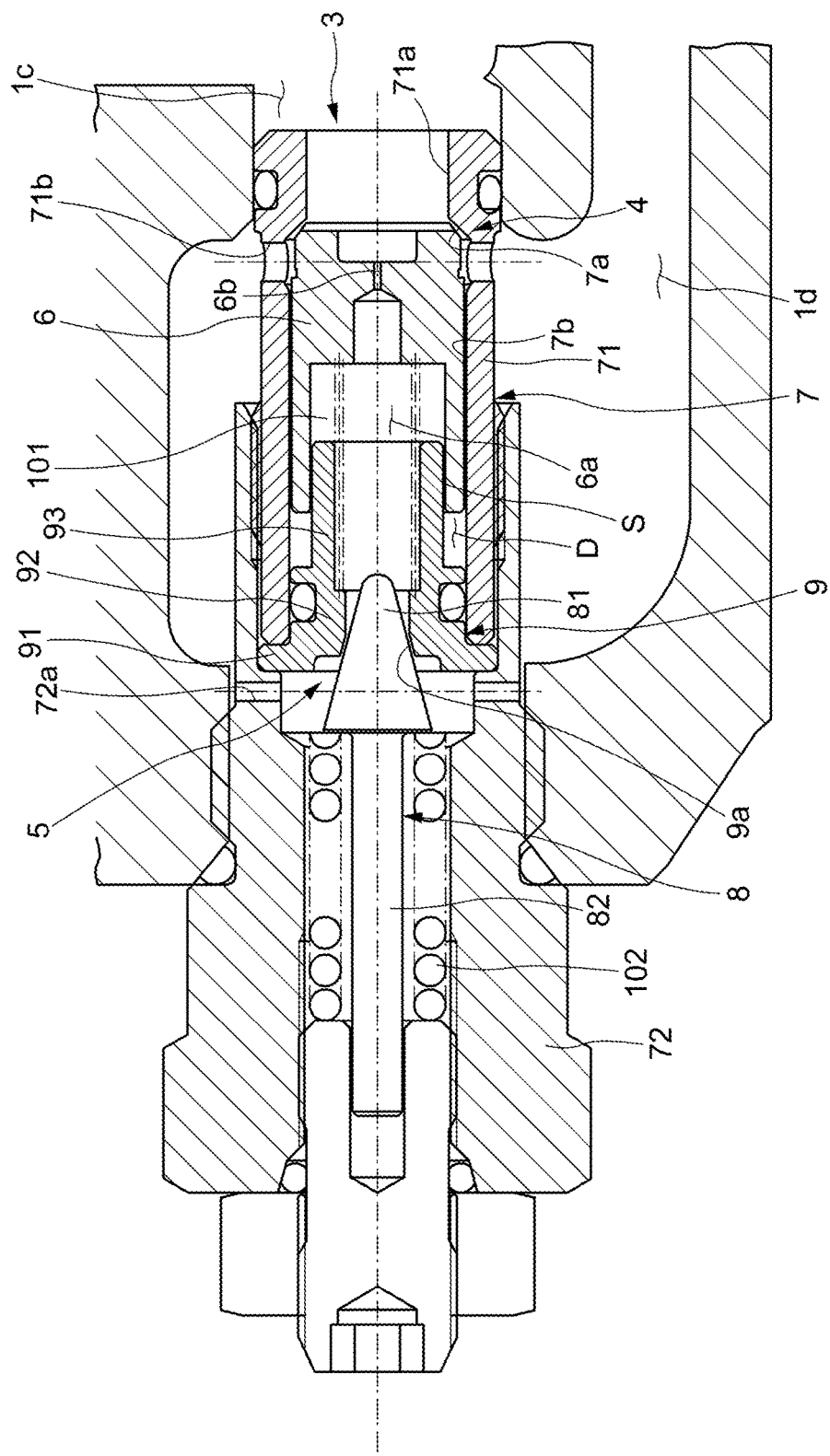
FIG. 4 is an explanatory diagram illustrating an operation of the pressure control valve according to the same embodiment.
Figure 5:
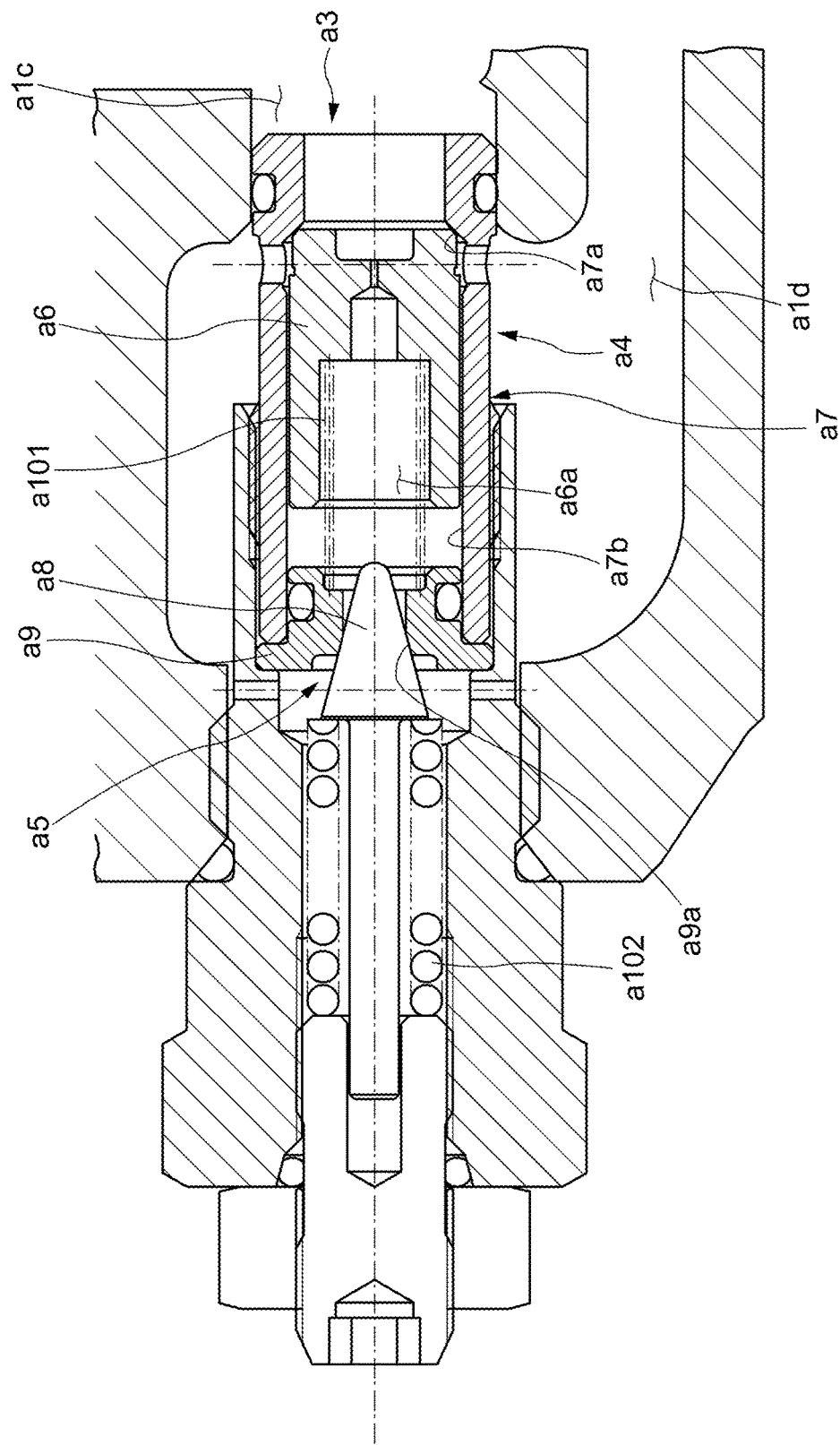
FIG. 5 is a schematic diagram illustrating a conventional pressure control valve.

As described above, the main valve portion 4 is formed by using the main valve body 6 and the valve accommodation body 7 including the main valve seat 7a on which the main valve body 6 sits as illustrated in FIGS. 2 to 4. The main valve body 6 is a bottomed cylinder member including a back pressure chamber 6a opened to a side opposite to a side facing the main valve seat 7a and includes a hole 6b communicating the back pressure chamber 6a with the pressure oil input port 1a. Meanwhile, the valve accommodation body 7 includes the first sleeve 71 which is disposed on the side of the pressure oil input port 1a and the second sleeve 72 of which one end portion accommodates a part of the first sleeve 71 and the other end portion is attached to the casing 1. The first sleeve 71 is a cylindrical member including a hydraulic liquid inlet 71a which is formed at an end portion facing the pressure oil input port 1a to communicate with the pressure oil input port 1a and a first hydraulic liquid outlet 71b which is formed at a side surface to communicate with the low-pressure passage 1d and is formed as the pilot chamber 7b so that the main valve body 6 is slidable therein. An upstream edge of the pilot chamber 7b is provided with the main valve seat 7a. The second sleeve 72 is connected to an end portion opposite to the hydraulic liquid inlet 71a of the first sleeve 71 by screw-connecting and accommodates the pilot valve body 8 of the pilot valve portion 5 therein. Further, the second sleeve 72 includes a second hydraulic liquid outlet 72a which communicates the inner space and the low-pressure passage 1d with each other. Then, the main valve portion 4 can be switched between a valve closed state where the main valve body 6 sits on the main valve seat 7a as illustrated in FIGS. 2 and 3 and a valve opened state where the main valve body 6 is separated from the main valve seat 7a as illustrated in FIG. 4. More specifically, a spring 101 which is an urging member urging the main valve body 6 toward the main valve seat 7a is provided between a bottom surface of the inner space 6a of the main valve body 6 and a bottom surface of the pilot valve seat member 9. When the pilot valve portion 5 is switched to the valve opened state so that a differential pressure is generated between the inside of the pilot chamber 7b (and the inside of the back pressure chamber 6a communicating with the pilot chamber 7b) and the cargo handling passage 1c, a force acting on the main valve body 6 due to the differential pressure overcomes the urging force of the spring 101 so that the main valve portion 4 is switched to the valve opened state.

As described above, as illustrated in FIGS. 2 to 4, the pilot valve portion 5 is formed by using the pilot valve body 8 which is movable inside the second sleeve 72 of the valve accommodation body 7 of the main valve portion 4 in a reciprocating manner and the pilot valve seat member 9 that includes the pilot valve seat 9a on which the pilot valve body 8 sits therein and is fixed between the first sleeve 71 and the second sleeve 72 of the valve accommodation body 7 of the main valve portion 4. The pilot valve body 8 includes a main valve member 81 that is formed in a substantially conical shape so that a diameter decreases toward the pressure oil input port 1a and a guide portion 82 which extends from the main valve member 81 toward a side opposite to a side facing the pressure oil input port 1a and slides inside the second sleeve 72. Meanwhile, as illustrated in FIG. 3, the pilot valve seat member 9 includes a flange portion 91 which is disposed between the first sleeve 71 and the second sleeve 72 and an attachment portion 92 which extends from the flange portion 91 toward the pressure oil input port 1a side and is disposed inside the first sleeve 71 and includes the pilot valve seat 9a which is formed at an end portion opposite to a side facing the pressure oil input port 1a. Then, the pilot valve portion 5 can be switched between a valve closed state where the pilot valve body 8 sits on the pilot valve seat 9a as illustrated in FIG. 2 and a valve opened state where the pilot valve body 8 is separated from the pilot valve seat 9a as illustrated in FIGS. 3 and 4. More specifically, a spring 102 which is an urging member urging the pilot valve body 8 toward the pilot valve seat 9a is provided between the second sleeve 72 and a base end of the guide portion 82 of the pilot valve body 8. When a hydraulic pressure introduced from the pressure oil input port 1a into the back pressure chamber 6a through the hole 6b of the main valve body exceeds a predetermined pressure, a force acting on the pilot valve body 8 due to the hydraulic pressure overcomes the urging force of the spring 102 so that the pilot valve portion 5 is switched to the valve opened state illustrated in FIG. 4.

However, in the embodiment, the pilot valve seat member 9 further includes a guide portion 93 which extends from the attachment portion 92 toward the pressure oil input port 1a side and reaches the inner space 6a of the main valve body 6. The guide portion guides the reciprocating movement direction of the main valve body 6. Moreover, a damper D is formed outside the guide portion 93 by the guide portion 93, the attachment portion 92, the first sleeve 71, and the main valve body 6. In other words, the damper D is formed in a space between the pilot valve seat member 9 and the front end of the main valve body 6 and outside the guide portion 93. A hydraulic liquid is introduced into the damper D through a gap S between the guide portion 93 and the main valve body 6.

Then, when the main valve body 6 performs a valve opening operation, the hydraulic liquid inside the damper D is pressed by the main valve body 6 so that the hydraulic liquid flows out toward the back pressure chamber 6a from a gap between the main valve body 6 and the guide portion 93. That is, the main valve body 6 receives a resistance due to a damping action. Further, the reciprocating movement direction of the main valve body 6 is guided by the guide portion 93.

Thus, according to the embodiment, since a sudden operation of the main valve body 6 is suppressed by the above-described damping action and the reciprocating movement direction of the main valve body 6 is guided by the guide portion 93, the occurrence of the chattering of the main valve body 6 is suppressed. Further, in the embodiment, since the damper D is formed by using a space between the main valve body 6 and the guide portion 93, it is possible to obtain the above-described effect only by changing the shape of the pilot valve seat member 9 without changing the shape of the portion involving with the pressure balance such as the hole 6b of the main valve body 6.

Furthermore, in the embodiment, since the guide portion 93 is formed to reach the back pressure chamber 6a of the main valve body 6, the volume of the inner space is decreased by the volume of the guide portion. Accordingly, it is also possible to suppress an unstable change in pressure and flow rate due to compressibility slightly existing in the hydraulic liquid inside the back pressure chamber. That is, it is also possible to stabilize a hydraulic pressure applied to a pilot poppet and also to suppress the chattering of the pilot poppet. In addition, since the reciprocating movement direction of the main valve body 6 is guided by the guide portion 93, it is possible to suppress a problem in which the direction of the main valve body 6 is suddenly changed and the main valve body 6 and the valve accommodation body 7 collide with each other to generate noise.

Then, since the damper D is formed by using a space between the pilot valve seat member 9 and the front end of the main valve body 6 and outside the guide portion 93, the damper D can be realized with a simple configuration.

In addition, the invention is not limited to the above-described embodiment.

For example, in the above-described embodiment, the guide portion extending from the attachment portion of the pilot valve seat member and reaching the inner space of the main valve body is provided and the space between the guide portion and the main valve body is formed as a damper chamber. However, as long as the flow resistance of the hydraulic liquid with the valve opening and closing operation of the main valve body can be increased by forming, for example, an annular protrusion protruding from the inner surface of the first sleeve 71, the damper may be provided by other configurations.

In addition, various modifications may be made without departing from the spirit of the invention.

According to the invention, it is possible to provide a balance piston type relief valve capable of suppressing a problem such as a vibration or noise inside a hydraulic circuit by stabilizing an operation of a main valve body.

The invention claimed is:
1. A pressure control valve comprising:
   a main valve portion which includes a main valve body having a back pressure chamber formed therein and a valve accommodation body having a main valve seat on which the main valve body sits and a pilot chamber accommodating the main valve body in a slidable manner; and
   a pilot valve portion which includes a pilot valve body and a pilot valve seat member having a pilot valve seat on which the pilot valve body sits,
   wherein when a pressure inside the pilot chamber exceeds a predetermined pressure, the pilot valve body is separated from the pilot valve seat to open the valve,
   wherein a damper is provided between the main valve body and the pilot valve seat member,
   wherein a front end portion of the pilot valve seat member is provided with a guide portion which reaches the inside of the back pressure chamber inside the main valve body and guides a reciprocating movement direction of the main valve body, and wherein the damper is formed by using a space between the pilot valve seat member and a front end of the main valve body and outside the guide portion.

\* \* \* \* \*